United States Patent
Tsai et al.

(10) Patent No.: US 11,161,595 B2
(45) Date of Patent: Nov. 2, 2021

(54) WING FLAP MECHANISM FOR HIGH FOWLER, DROOPING SPOILERS AND HIGH EFFICIENCY

(71) Applicant: The Boeing Company, Chicago, IL (US)

(72) Inventors: Kevin R. Tsai, Seattle, WA (US); Kyle A. Johnson, Fall City, WA (US)

(73) Assignee: The Boeing Company, Chicago, IL (US)

( * ) Notice: Subject to any disclaimer, the term of this patent is extended or adjusted under 35 U.S.C. 154(b) by 353 days.

(21) Appl. No.: 16/172,748

(22) Filed: Oct. 27, 2018

(65) Prior Publication Data

US 2020/0130812 A1   Apr. 30, 2020

(51) Int. Cl.
   *B64C 9/18*   (2006.01)
   *B64C 13/30*   (2006.01)

(52) U.S. Cl.
   CPC .............. *B64C 9/18* (2013.01); *B64C 13/30* (2013.01)

(58) Field of Classification Search
   CPC .............. B64C 9/16; B64C 9/18; B64C 9/20
   See application file for complete search history.

(56) References Cited

U.S. PATENT DOCUMENTS

| | | | | |
|---|---|---|---|---|
| 3,853,289 A | * | 12/1974 | Nevermann | B64C 9/16 244/215 |
| 8,511,608 B1 | * | 8/2013 | Good | B64C 9/18 244/99.3 |
| 2015/0292561 A1 | * | 10/2015 | McNeil | F16C 23/086 244/213 |

* cited by examiner

*Primary Examiner* — Richard G Davis
(74) *Attorney, Agent, or Firm* — Felix L. Fischer

(57) ABSTRACT

A trailing edge flap mechanism for an aircraft incorporates a flap actuator 28 and a fore flap link 30 that pivots by actuation of the flap actuator. The fore flap link has a hinged end 32 pivotally coupled to a fore flap structure 34 and a clevis end 36 pivotally coupled to a fixed wing structure 18 at a first hinge axle 38. A rocking lever 40 is pivotally coupled to a second hinge axle 42 on the fixed wing structure. A connector bar 44 has a first end 46 pivotally coupled to the fore flap link at a first connection axle 48 and a second end 50 pivotally coupled to the rocking lever at a second connection axle 52. Pivotal movement of the fore flap link causes movement of the connector bar that is translated into rotational movement of the rocking lever about second hinge axle 42 to move an aft flap link 54 pivotally coupled to an aft flap structure 56 at a first pivot axle 58 and pivotally coupled to the rocking lever at a second pivot axle 60, thereby deploying the flap to a lowered position relative to a trailing edge portion of the wing.

20 Claims, 11 Drawing Sheets

WING FLAP MECHANISM FOR HIGH FOWLER, DROOPING SPOILERS AND HIGH EFFICIENCY

This application is copending with application Ser. No. 16/172,748 filed on Oct. 27, 2018 and entitled FLAP SUPPORT MECHANISM-C BAR.

BACKGROUND INFORMATION

Field

Embodiments of the disclosure relate generally to the field of aircraft flap extension systems and, more particularly to a trailing edge flap mechanism employing a pivoting fore flap link engaged to a rocking lever with mechanical advantage to urge an aft flap link downward for increased camber with minimized chord growth.

Background

Aircraft employ flaps which increase camber of the wings for enhanced aerodynamic efficiency in take-off and landing. Various mechanical arrangements have been developed to deploy the flaps from retracted to extended positions. Prior art solutions for large commercial aircraft may have high actuator loads which require complex mechanical arrangements and large actuators or transmission systems which may increase aircraft weight, cost and complexity.

SUMMARY

Exemplary implementations provide a trailing edge flap mechanism for an aircraft incorporating a flap actuator and a fore flap link that pivots by actuation of the flap actuator. The fore flap link has a hinged end pivotally coupled to a fore flap structure and a clevis end pivotally coupled to a fixed wing structure at a first hinge axle. A rocking lever is pivotally coupled to a second hinge axle on the fixed wing structure. A connector bar has a first end pivotally coupled to the fore flap link at a first connection axle and a second end pivotally coupled to the rocking lever at a second connection axle. Pivotal movement of the fore flap link causes movement of the connector bar that is translated into rotational movement of the rocking lever about the second hinge axle to downwardly draw an aft flap link pivotally coupled to an aft flap structure at a first pivot axle and pivotally coupled to the rocking lever at a second pivot axle, thereby deploying the flap to a lowered position relative to a trailing edge portion of the wing.

The implementations disclosed provide a method for deployment of an aircraft flap wherein a fore flap link is engages by a drive screw with rotation provided by an actuator. The fore flap link is rotated about a first hinge axle attached to a fixed wing structure inducing rotation in a rocking lever about a second hinge axle with a connector bar, pivotally attached to the fore flap link at a first connection axle and the rocking lever at a second connection axle. An aft flap link is drawn downward with the rocking lever, with the aft flap link causing a flap, pivotally attached to the aft flap link at an aft flap structure, to be drooped downward.

BRIEF DESCRIPTION OF THE DRAWINGS

The features, functions, and advantages that have been discussed can be achieved independently in various embodiments of the present invention or may be combined in yet other embodiments further details of which can be seen with reference to the following description and drawings.

DETAILED DESCRIPTION

The implementations described herein provide a trailing edge flap mechanism for high fowler and drooping spoiler configuration on an aircraft. A leveraged configuration with a fore flap link driving a rocking lever with one or more connector bars offset from hinge points of the fore flap link and rocking lever for added mechanical advantage reduces actuator loads significantly and maintains strong mechanical advantage throughout the flap travel. Lower actuator loads enable reduced burden on the actuator system thereby reducing weight and cost.

Figure 1A:
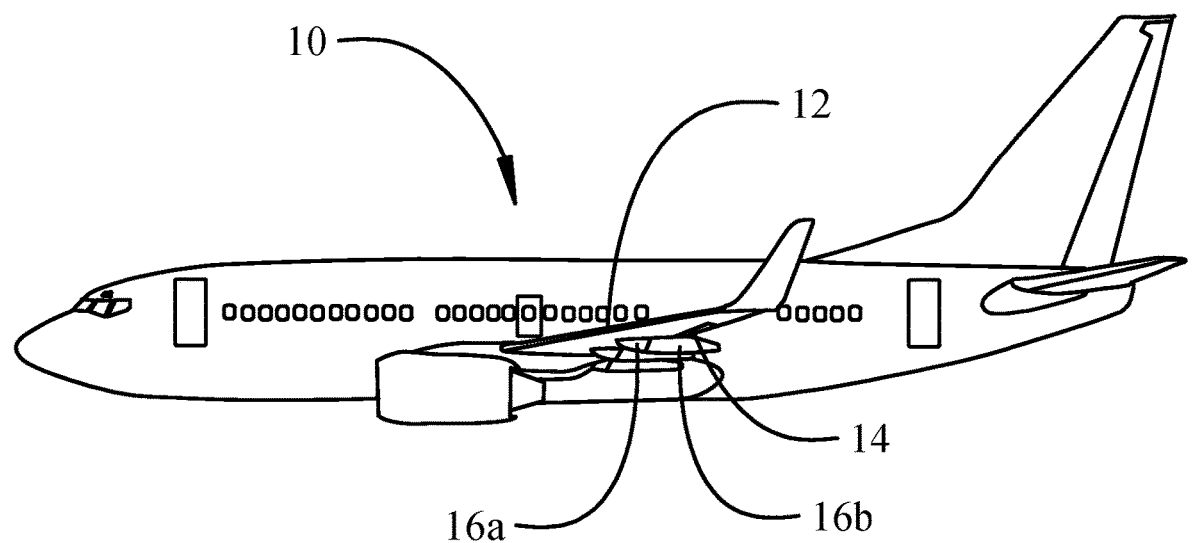
FIG. 1A is a representation of an aircraft in which the implementations disclosed herein may be employed.
Figure 1B:
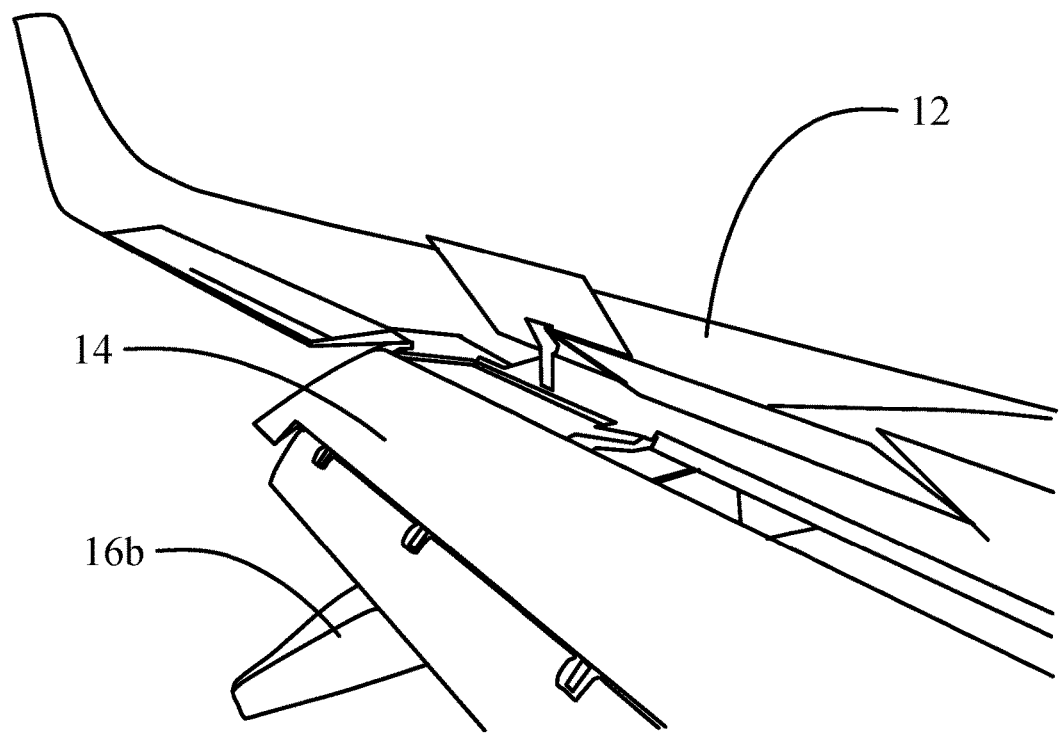
FIG. 1B is a detailed pictorial representation of the wing and flap of the aircraft of FIG. 1A.
Figure 1C:
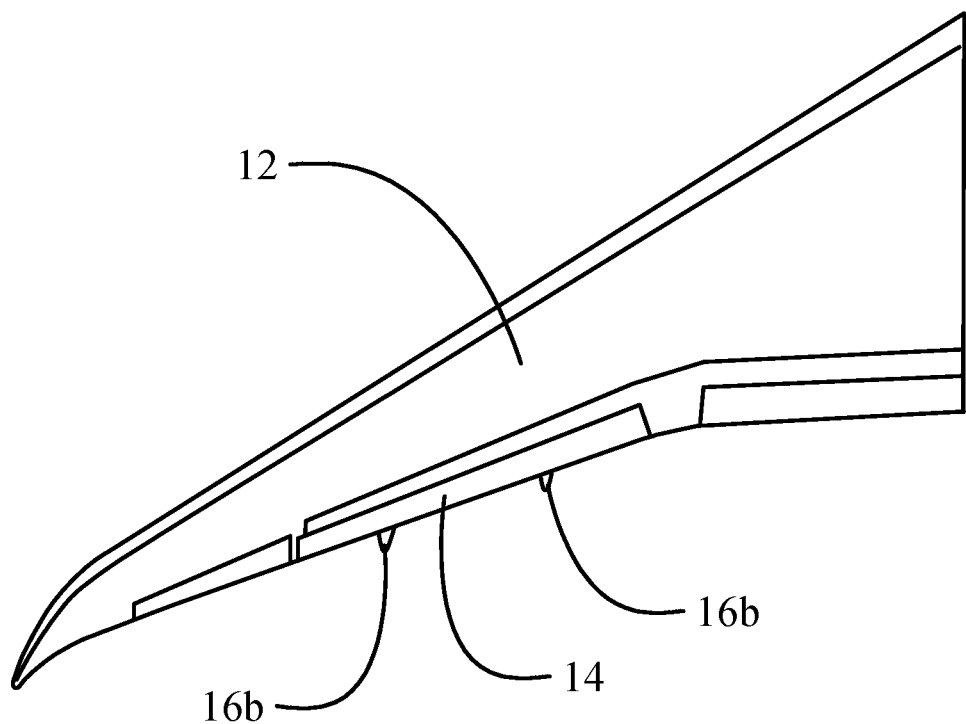
FIG. 1C is a top view of the wing and flaps of FIG. 1B.
Figure 2:
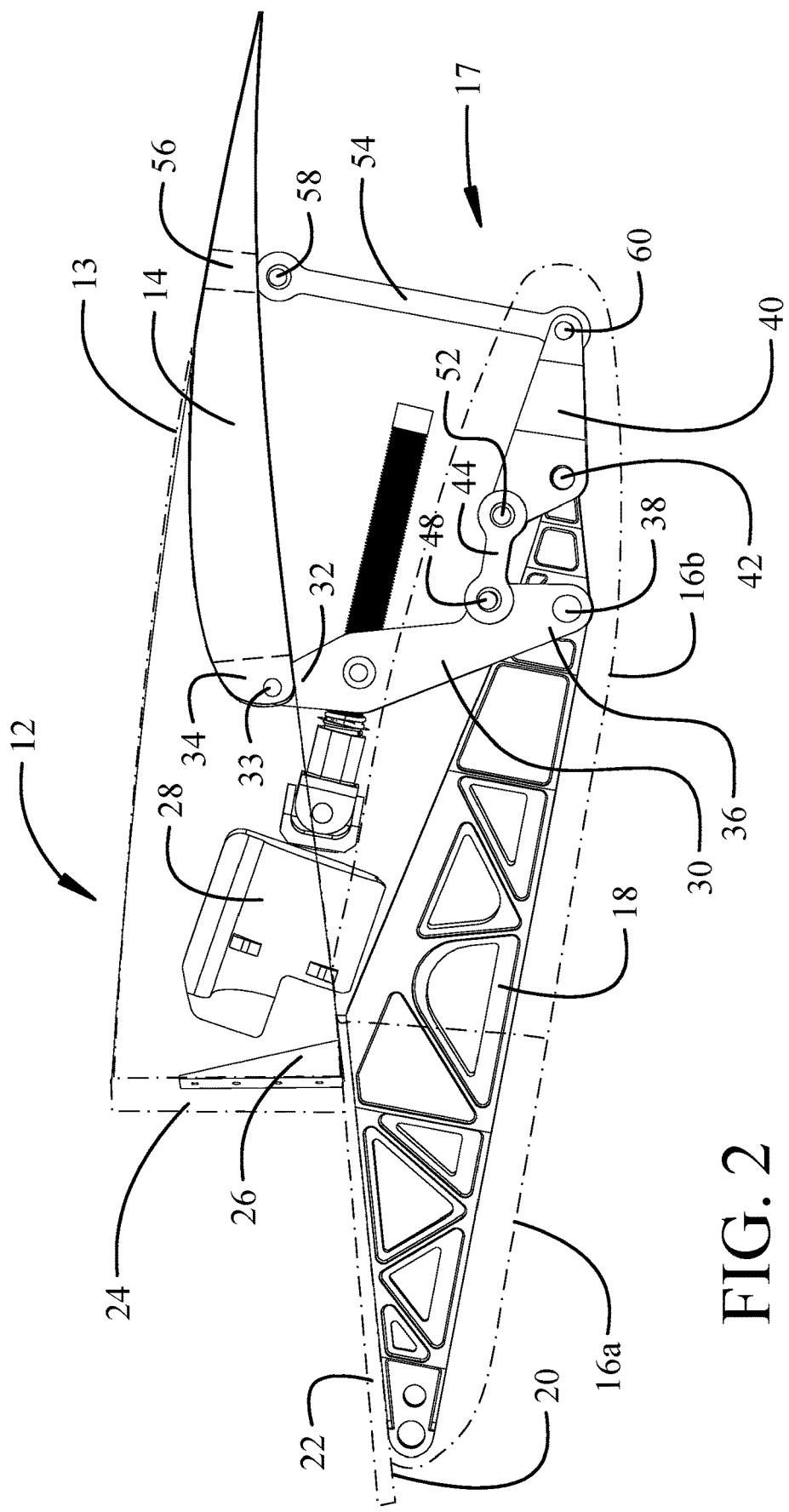
FIG. 2 is a detailed side view of the underwing beam and flap with the attached actuator and links.

Referring to the drawings, FIGS. 1A, 1B and 1C depict an aircraft 10 having a wing 12 with operating flaps 14. The flaps 14 are engaged to the wing 12 at multiple attachment points with underwing structures partially housed within fixed fairings 16a and movable fairings 16b. Extension of the flaps 14 to enhance aerodynamic performance during takeoff and landing is accomplished with a trailing edge flap mechanism 17 causes the flaps 14 and movable fairings 16b to rotate downward relative to the wing 12. As seen in FIG. 2, at each attachment point an underwing beam (UWB) 18 provides fixed wing structure to attach the flaps 14 and associated operating support links and actuators (to be described in greater detail subsequently) to the wing 12. The UWB 18 is attached to the wing 12 on a lower surface 20 formed by a wing lower skin 22 and partially housed within the fixed fairing 16a. A rear spar 24 extends upward within the wing 12 from the wing lower skin 22 and the UWB 18 is attached to the rear spar with attachment brackets 26.

The trailing edge flap mechanism 17 incorporates a flap actuator 28 attached to the UWB 18. A fore flap link 30 is operably connected to a drive screw 29 of the actuator 28 and pivots by actuation of the flap actuator. A hinged end 32 of the fore flap link is pivotally coupled at a drive axle 33 to a fore flap structure 34 such as a cap spar or forward spar in the flap 14. A clevis end 36 of the fore flap link 30 is pivotally coupled to the UWB 18 with a first hinge axle 38 that is located such that the fore flap link 30 pivots to move the flap between a retracted position proximate a trailing edge portion 13 of a wing 12 and a deployed lowered position. Drive axle 33 is located at a pivot length 31 between the first hinge axle 38 and the drive axle 33. A rocking lever 40 is pivotally coupled to a second hinge axle 42 on the UWB 18. A connector bar 44 has a first end 46 pivotally coupled to the fore flap link with a first connection axle 48 and a second end 50 pivotally coupled to the rocking lever with a second connection axle 52. The first connection axle 48 is offset from first hinge axle 38 by a first lever arm 39 and the second connection axle 52 is offset from second hinge axle 42 by a second lever arm 43 (seen and described with respect to FIG. 3 subsequently). As will be described in greater detail with respect to FIGS. 5A-5E, pivotal movement of the fore flap link 30 about the first hinge axle 38 urges the drive axle 33 aft and causes movement of the connector bar 44 that is translated into rotational movement (represented by arrow 45) of the rocking lever 40 about second hinge axle 42. A supporting aft flap link 54, pivotally coupled to an aft flap structure 56, such as an aft spar of the flap 14, at a first pivot axle 58 and pivotally coupled to the rocking lever 40 at a second pivot axle 60, is drawn downward to urge the flap 14 to a lowered position relative to the trailing edge portion 13 of the wing 12. The axle dimensions and interconnections shown in the drawings are exaggerated for clarity.

Figure 3:
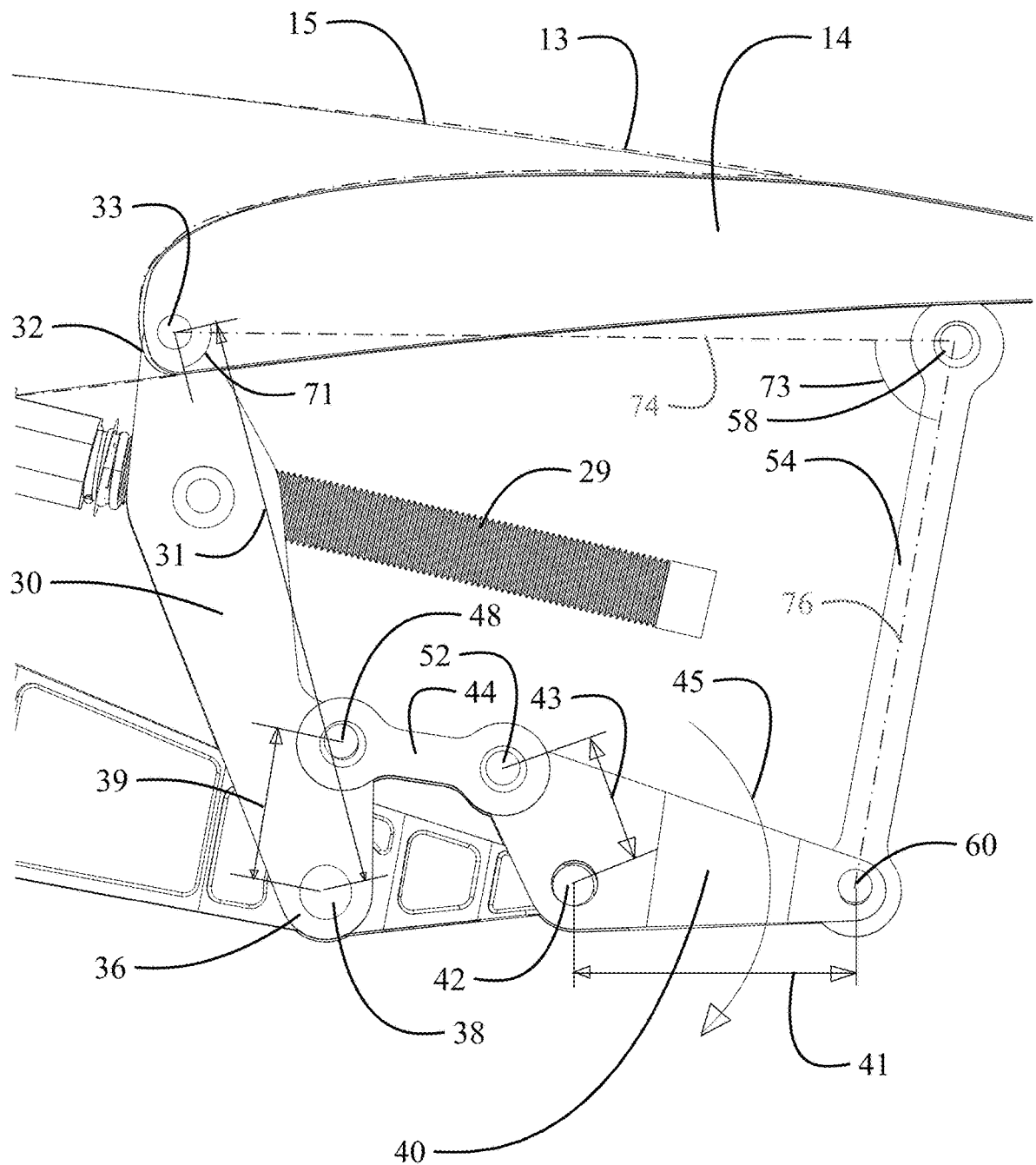
FIG. 3 is a close-up side view of the trailing edge flap mechanism.

As seen in close up FIG. 3, the coupling of the connector bar 44 to the fore flap link 30 between the clevis end 36 and the hinged end 32 provides a mechanical advantage with respect to the force applied by the flap actuator 28 to pivot the fore flap link 30. The resulting applied force to the connector bar 44 due to lever arm 39 between first hinge axle 38 and first connection axle 48 produces rotation of the rocking lever 40 and associated movement of the aft flap link 54 deploys the flap 14 to a lowered position. The length of second lever arm 43 between second hinge axle 42 and second connection axle 52 enhances the rotation of rocking lever 40 about second hinge axle 42. This feature along with rocking length 41 of the rocking lever 40 between the second hinge axle 42 and second pivot axle 60 draws second pivot axle 60 and aft flap link 54 downward more aggressively to provide variable camber of a trailing edge 35 of the flap 14 while reducing chord growth of the wing during extension of the flap and with the flap in the extended position. Reduction in chord growth may be particularly applicable for trailing edge variable camber (TEVC) operations. The TEVC will operate by deflecting the trailing edge flaps in 0.5° increments while in cruise and the aggressive droop provided by disclosed trailing edge flap mechanism 17 herein.

Significant mechanical advantage is provided by the relationship of n rocking length of the rocking lever 40, pivot length of the fore flap link 30 and lever arms of the connector bars 44. In exemplary implementations pivot length 31 and length of lever arm 39 have a ratio of between 3 and 5, the length of lever arm 39 and length of second lever arm 43 have a ratio of between 0.6 and 1.5, rocking length 41 and the length of second lever arm 43 have a ratio of between 1.5 and 3, and rocking length 41 and pivot length 31 have a ratio of between 0.2 to 0.7.

Figure 4:
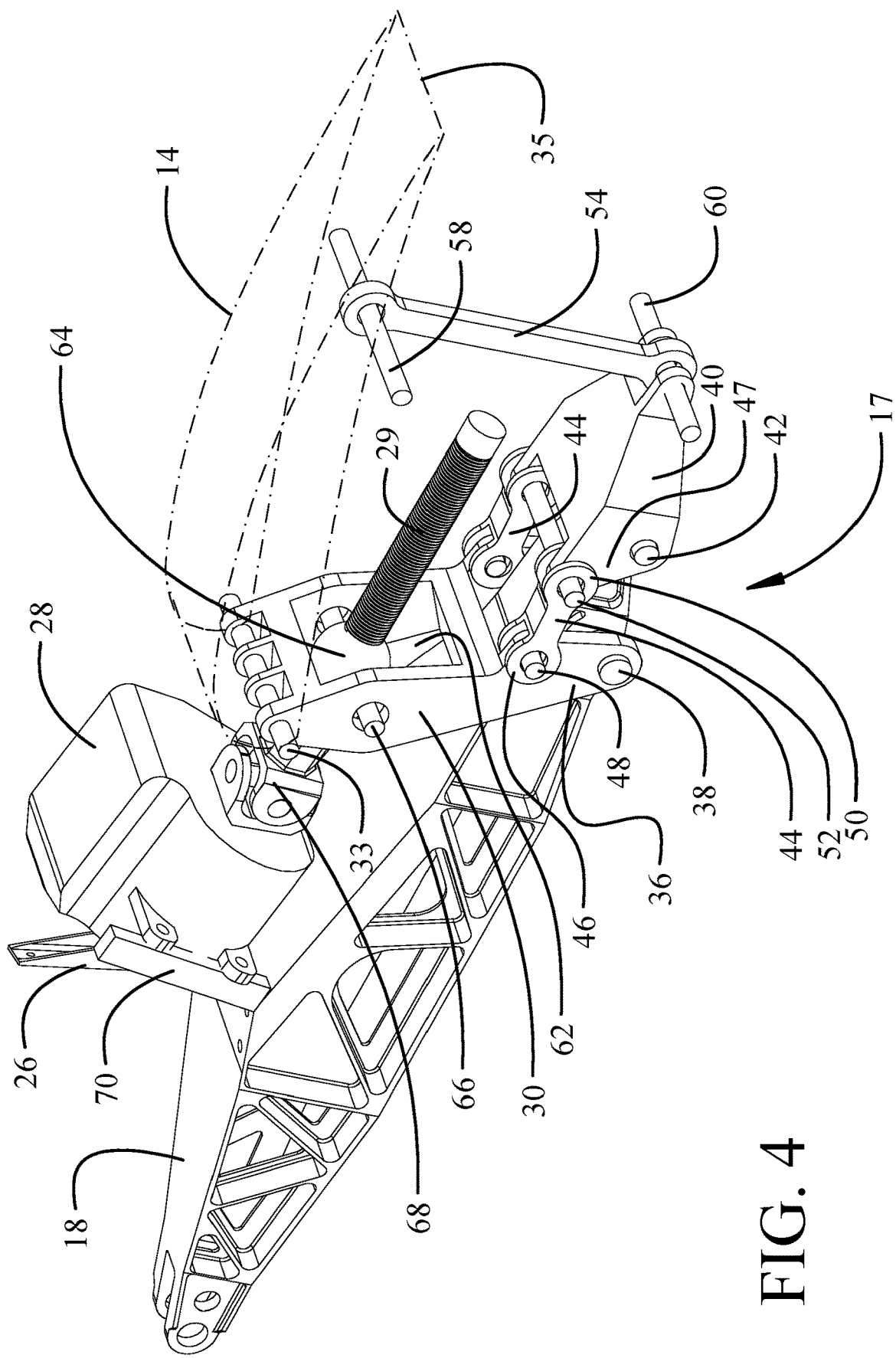
FIG. 4 is a pictorial detailed representation of the exemplary implementation of the trailing edge flap mechanism.

As seen in the detail view of FIG. 4 for the exemplary implementation, the clevis arrangement of fore flap link 30 facilitates the use of two connector bars 44 engaging the first and second connection axles 48 and 52. Rocking lever 40 also employs a clevis structure at a forward end 47 for engagement of the second hinge axle 42 with the UWB 18 and the second connection axle 52. The drive screw 29 from the actuator 28 is received through a central aperture 62 in the fore flap link 30 and a ball nut 64 engaging the drive screw 29 is supported on rotatable pins 66 extending into the central aperture 62. A universal joint 68 is employed to connect the drive screw 29 to the actuator 28 to resolve off-axis motion of the ball nut 64 during flap extension. The actuator 28 is mounted to the UWB 18 with brackets 70.

Figure 5A:
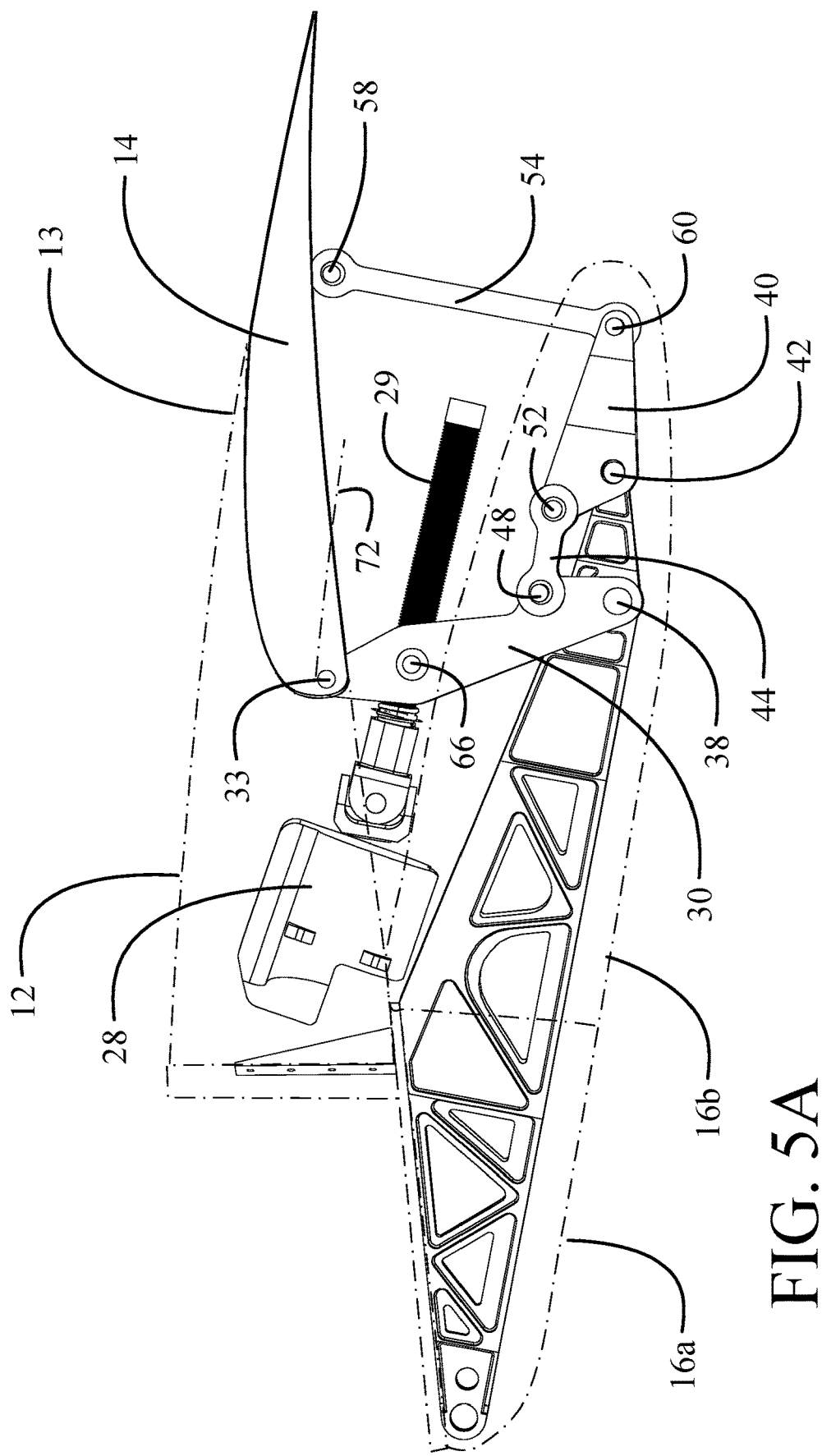
FIGS. 5A-5E demonstrate a sequence of operation for deployment of the flap by the trailing edge flap mechanism; and, FIG. 6 is a flow chart of a method for deployment of an aircraft flap employing the disclosed implementation.
Figure 5B:
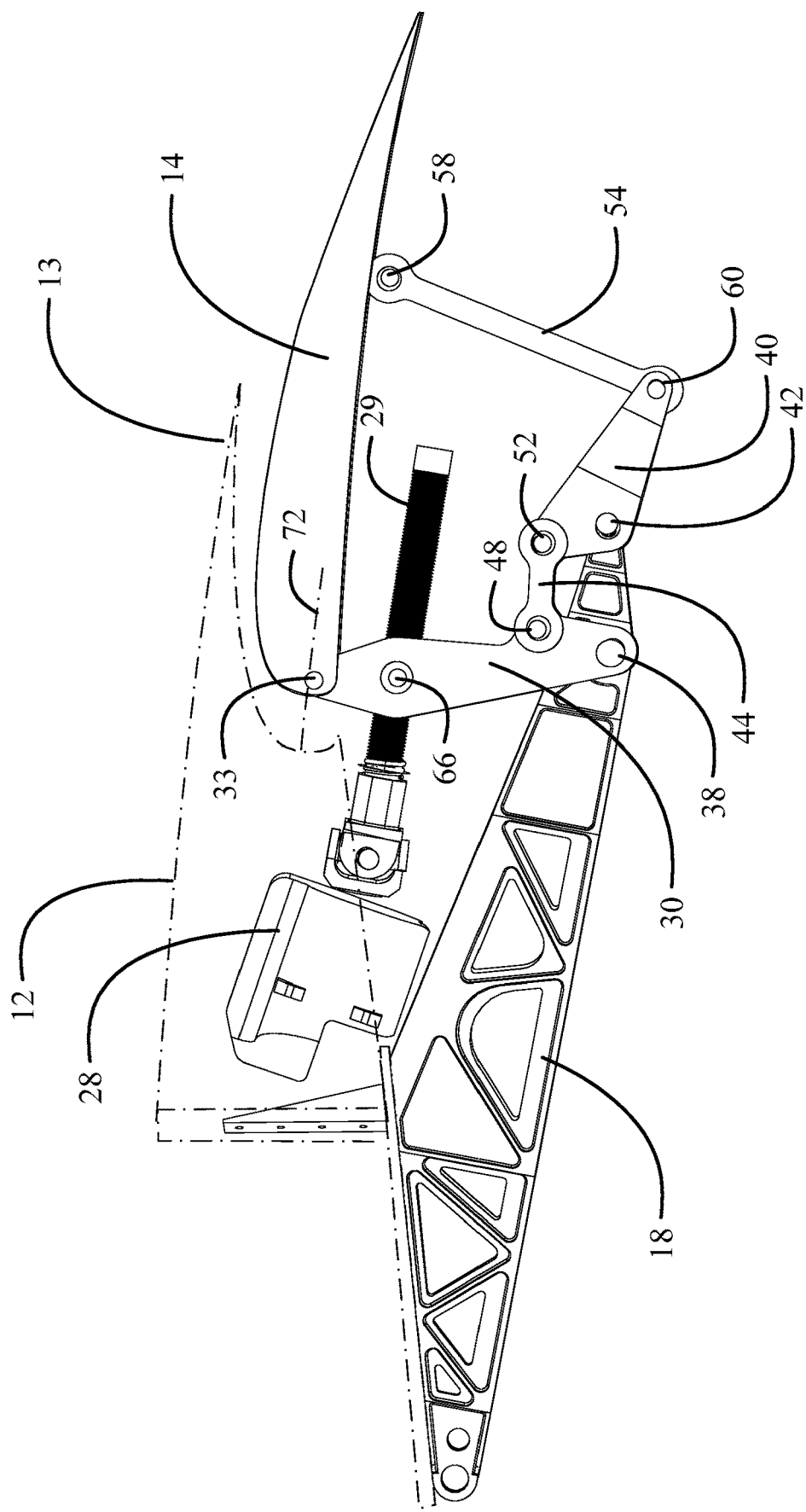
Figure 5C:
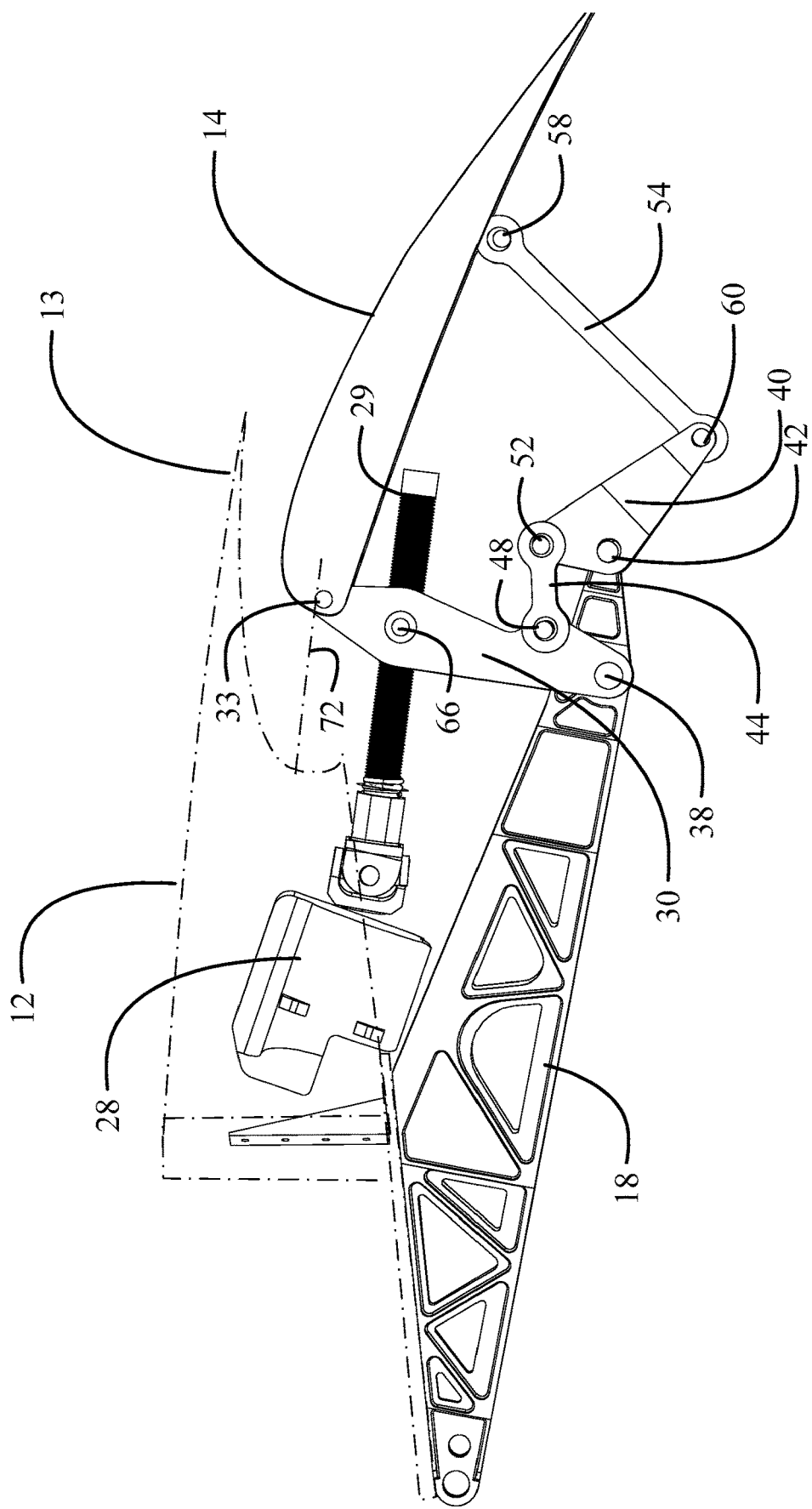
Figure 5D:
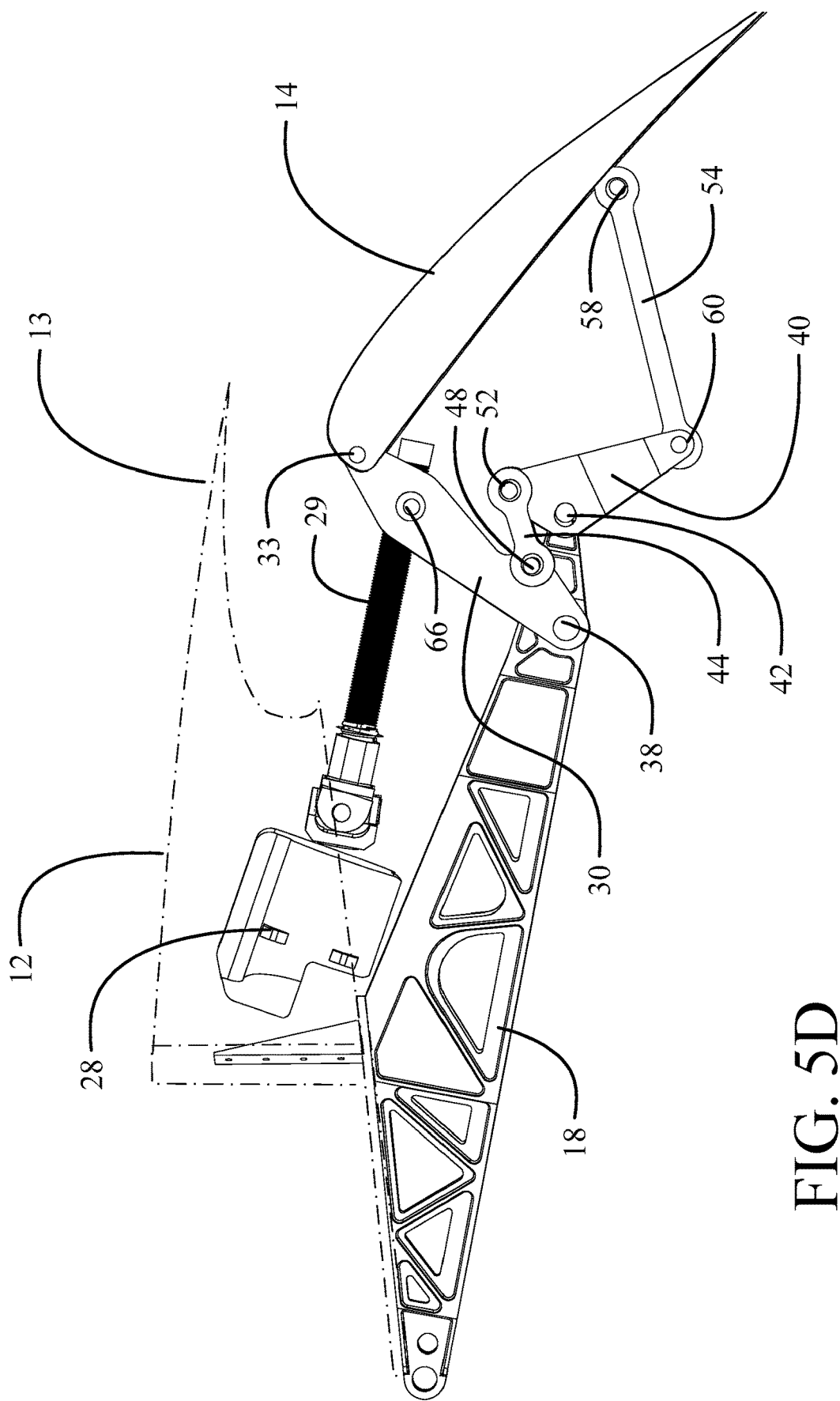
Figure 5E:
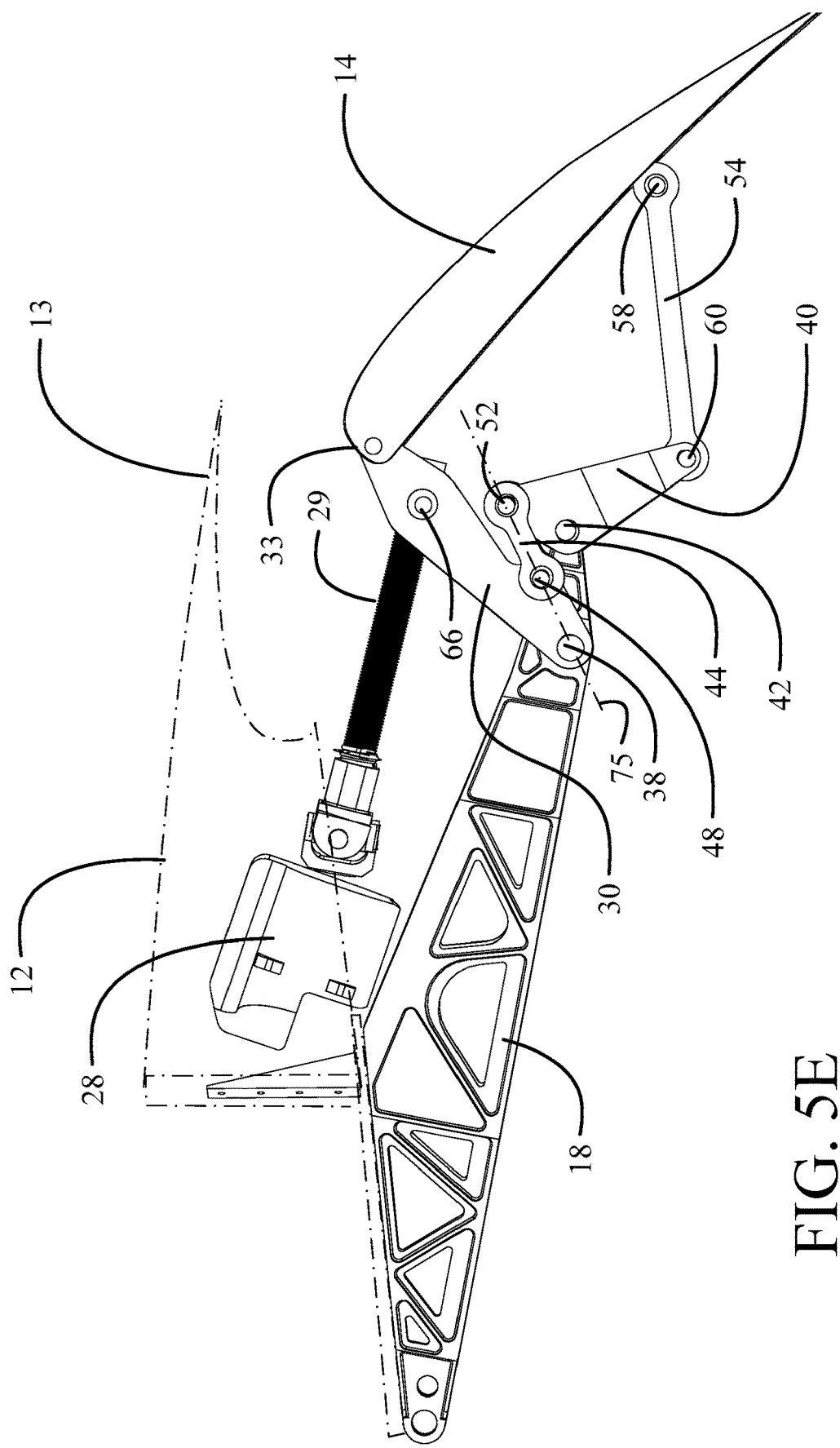

Motion of the trailing edge flap mechanism 17 is shown in FIGS. 5A-5E for a range of lowered (drooped) positions of the flap 14 (10° FIG. 5B, 25° FIG. 5C, 44° FIG. 5D and 47° FIG. 5E). As the flap 14 is lowered by rotation of the fore flap link 30 by drive screw 29 and ball nut 64 about first hinge axle 38, connector bars 44 induce rotation of the rocking lever 40 about second hinge axle 42 which droops the aft flap link 54 more aggressively than a mere pivotal attachment of the aft flap link to the UWB 18 would provide. Additionally, employing the rocking lever 40 to draw the aft flap link 54 downward maintains a substantially fixed angular relationship between the fore flap link 30 and the flap 14 through the majority of the range of motion (seen in FIG. 3 as angle 71). The motion of rocking lever 40 allows a less acute angle (represented in FIG. 3 as angle 73) to be maintained between the flap 14 and aft flap link 54 as represented by an axis 74 between the drive axle 33 and first pivot axle 58 and the centerline 76 of the aft flap link 54 between first pivot axle 58 and second pivot axle 60. In exemplary implementations, angle 73 at 0° flap deflection is 80° and is no less than 70° through half flap deflection (a reduction of the acute angle of only 10°). Angle 73 remains at least 50° (reduction in the acute angle of less than 30°) at full flap deflection. This feature reacts the load more directly in axial tension along the aft flap link 54, reducing unproductive off-axis loads on the fore flap link 30. Position of the first hinge axle 38 at a point on the UWB 18 and pivot length 31 of the fore flap link 30 (seen in FIG. 3) are determined such that pivotal movement of the fore flap link 30 causes the drive axle 33 and fore flap structure 34 to initially move in a first transition portion along a path parallel to a tangent of curvature of the trailing edge portion 13 of the wing 12 as seen in FIGS. 5A-5C as profile 72, while the trailing edge of the flap is aggressively drooped by the aft flap link 54.

The connector bar 44 between the fore flap link 30 and the rocking lever 40 approaches an 'over center' position with first hinge axle 38, first connection axle 48 and second connection axle 52 substantially aligned (as indicated by line 75 at a fully deployed position. This allows the loads on the actuator 28 to remain low when the flap 14 is fully deployed.

Figure 6:
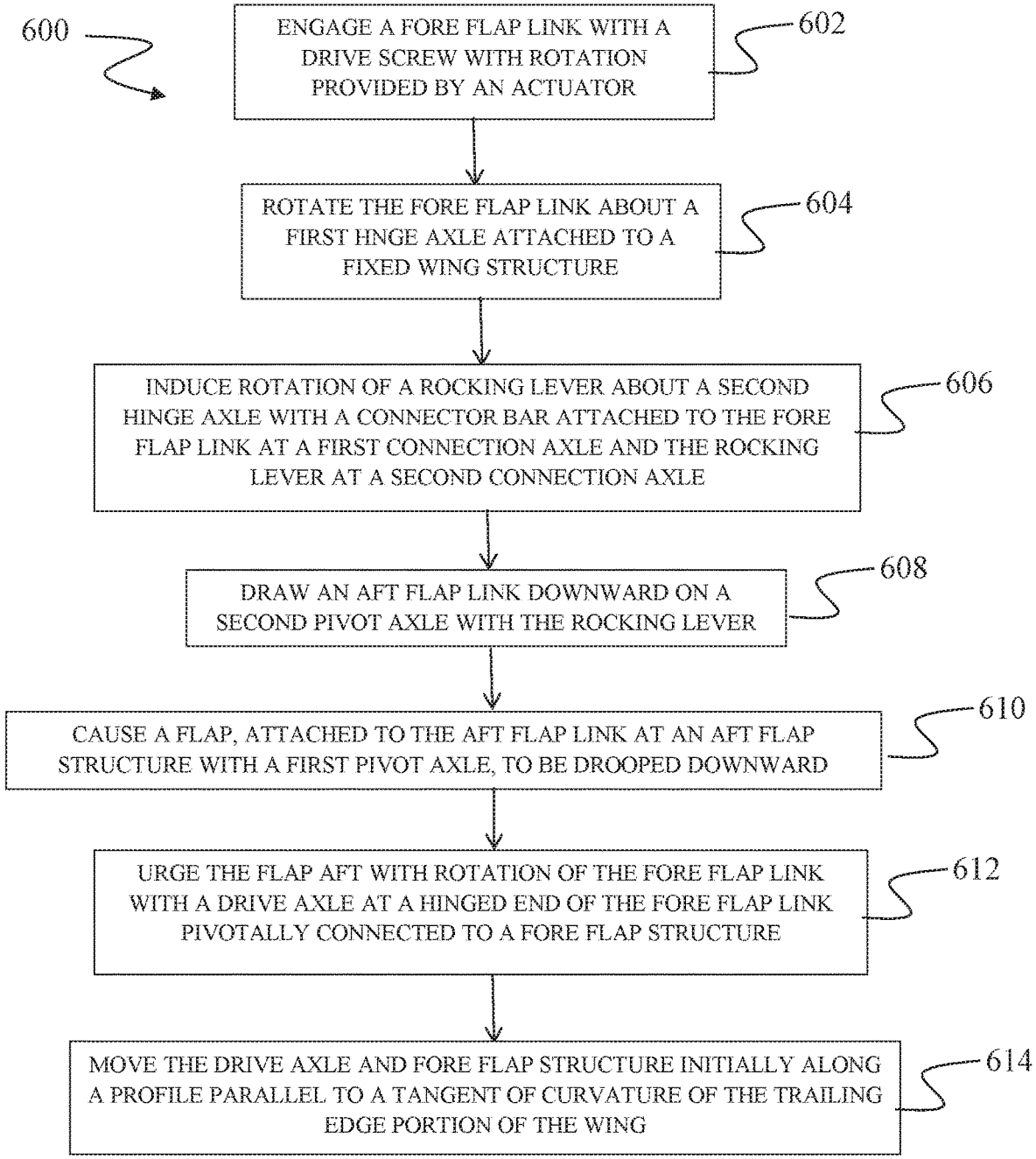

The implementations disclosed herein enable a method 600 as shown in FIG. 6 for deploying flaps for large commercial aircraft. A fore flap link 30 is engaged by a drive screw 29 with rotation provided by an actuator 28, step 602. The fore flap link 30 is rotated about a first hinge axle 38 attached to a fixed wing structure (UWB 18), step 604. A connector bar 44, pivotally attached to the fore flap link 30 at a first connection axle 48 and a rocking lever 40 at a second connection axle 52, induces rotation in the rocking lever 40 about a second hinge axle 42, step 606. The first connection axle 48 is offset by a lever arm 39 from the first hinge axle 38 and the second connection axle 52 is offset from the second hinge axle 42 by a lever arm 43 for mechanical advantage. The rocking lever 40 draws an aft flap link 54 downward on a second pivot axle 60, step 608, with the aft flap link causing a flap 14, attached to the aft flap link at an aft flap structure 56 with a first pivot axle 58, to be drooped downward, step 610. The length 41 of the rocking lever 40 between the second hinge axle 42 and second pivot axle 60 is determined to provide rapid droop of the flap 14 while maintaining an acute angle 73 greater than 70° between the aft flap link 30 and the flap 14 through the majority of the range of motion. A drive axle 33, at a hinged end 32 of the fore flap link 30 pivotally and connected to a fore flap structure 34, urges the flap 14 aft with rotation of the fore flap link, 612. The drive axle 33 and fore flap structure 34 initially move in a first transition portion along a profile 72 parallel to a tangent of curvature of the trailing edge portion 13 of the wing 12, step 614. Position of the first hinge axle 38 at a point on the UWB 18 and pivot length 31 of the fore flap link 30 are determined such that pivotal movement of the fore flap link 30 moves the drive axle 33 and fore flap structure 34 on the profile 72.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A trailing edge flap mechanism for an aircraft, comprising:
    a flap actuator;
    a fore flap link that pivots by actuation of the flap actuator, said fore flap link having a hinged end pivotally coupled to a fore flap structure, and a clevis end pivotally coupled to an underwing beam (UWB) at a first hinge axle;
    a rocking lever pivotally coupled to a second hinge axle on the UWB;
    a connector bar having a first end pivotally coupled to the fore flap link at a first connection axle and a second end pivotally coupled to the rocking lever at a second connection axle;
    whereby pivotal movement of the fore flap link causes movement of the connector bar that is translated into rotational movement of the rocking lever about second hinge axle to move an aft flap link pivotally coupled to an aft flap structure at a first pivot axle and pivotally coupled to the rocking lever at a second pivot axle, thereby deploying a flap to a lowered position relative to a trailing edge portion of a wing.

2. The trailing edge flap mechanism as defined in claim 1, wherein the connector bar is coupled to the fore flap link between the clevis end and the hinged end, such that a mechanical advantage is provided with respect to a flap actuator applied force to pivot the fore flap link, with a resulting applied force to the connector bar to produce movement of the rocking lever and flap support link to deploy the flap to a lowered position.

3. The trailing edge flap mechanism as defined in claim 2 wherein the mechanical advantage comprises a lever arm between the first connection axle and first hinge axle to produce rotation of the rocking lever and associated movement of the flap support link to deploy the flap to a lowered position.

4. The trailing edge flap mechanism as defined in claim 3 wherein the mechanical advantage further comprises a second lever arm between the second connection axle and second hinge axle thereby enhancing rotation of rocking lever about hinge axle.

5. The trailing edge flap mechanism as defined in claim 4 wherein the mechanical advantage further comprises a rocking length of the rocking lever between the second hinge axle and second pivot axle which draws second pivot axle and flap support link downward thereby reducing chord growth of the wing during extension of the flap and with the flap in an extended position.

6. The trailing edge flap mechanism as defined in claim 5 wherein the rocking length and second lever arm have a ratio of between 1.5 and 3.

7. The trailing edge flap mechanism as defined in claim 5 wherein the fore flap link has a pivot length and the rocking length and pivot length have a ratio of between 0.2 to 0.7.

8. The trailing edge flap mechanism as defined in claim 4 wherein lever arm and second lever arm have a ratio of between 0.6 and 1.5.

9. The trailing edge flap mechanism as defined in claim 4 wherein the fore flap link has a pivot length and pivot length and lever arm have a ratio of between 3 and 5.

10. The trailing edge flap mechanism as defined in claim 1, wherein the aft flap link maintains an acute angle of at least 70° between a axis extending from drive axle to the first pivot axle and a centerline of the aft flap link at least 25° of flap deflection.

11. The trailing edge flap mechanism as defined in claim 1 wherein the connector bar between the fore flap link and the rocking lever approaches a position with first hinge axle, first connection axle and second connection axle substantially aligned at a fully deployed position.

12. The trailing edge flap mechanism as defined in claim 1 wherein the rocking lever has a clevis structure at a forward end, the clevis structure engaging the second hinge axle with the UWB and the second connection axle.

13. A trailing edge flap mechanism for an aircraft comprising:
    a flap actuator;
    a fore flap link that pivots by actuation of the flap actuator, said fore flap link having a hinged end pivotally coupled to a fore flap structure, and a clevis end pivotally coupled to a fixed wing structure at a first hinge axle wherein a drive screw operably extending from the flap actuator is received through a central aperture in the fore flap link and a ball nut engages the drive screw, said ball nut supported on rotatable pins extending into the central aperture;
    a rocking lever pivotally coupled to a second hinge axle on the fixed wing structure;
    a connector bar having a first end pivotally coupled to the fore flap link at a first connection axle and a second end pivotally coupled to the rocking lever at a second connection axle;
    whereby pivotal movement of the fore flap link causes movement of the connector bar that is translated into rotational movement of the rocking lever about second hinge axle to move an aft flap link pivotally coupled to an aft flap structure at a first pivot axle and pivotally coupled to the rocking lever at a second pivot axle, thereby deploying a flap to a lowered position relative to a trailing edge portion of a wing.

14. The trailing edge flap mechanism as defined in claim 13 wherein a universal joint connects the drive screw to the flap actuator to resolve off-axis motion of the ball nut during flap extension.

15. A method for flap deployment in an aircraft, said method comprising:
    engaging a fore flap link operatively with an actuator;
    rotating the fore flap link about a first hinge axle attached to an underwing beam (UWB);
    inducing rotation in a rocking lever about a second hinge axle attached to the UWB with a connector bar, pivotally attached to the fore flap link at a first connection axle and the rocking lever at a second connection axle; and,
    drawing an aft flap link downward on a second pivot axle with the rocking lever with the aft flap link causing a flap, attached to the aft flap link at an aft flap structure with a first pivot axle, to be drooped downward.

16. The method as defined in claim 15 further comprising urging the flap aft with rotation of the fore flap link using a first drive axle at a hinged end of the fore flap link pivotally connected to a fore flap structure.

17. The method as defined in claim 15 wherein the first connection axle is offset by a lever arm from the first hinge axle and the second connection axle is offset from the second hinge axle by a lever arm for mechanical advantage.

18. The method as defined in claim 15 wherein a length of the rocking lever between the second hinge axle and second pivot axle is determined wherein a rocking length of the rocking lever and a length of a lever arm between the second hinge axle and the second connection axle have a ratio of between 1.5 and 3 to provide rapid droop of the flap.

19. The method as defined in claim 18 wherein the length of the rocking lever is further determined wherein the rocking length and a pivot length of the fore flap link have a ratio of between 0.2 to 0.7 to maintain a less acute angle between the aft flap link and the flap through a majority of a range of motion.

20. The method as defined in claim 15 wherein the step of rotating the fore flap link comprises rotating a drive screw operably extending from the actuator received through a central aperture in the fore flap link and driving a ball nut engaged to the drive screw, said ball nut supported on rotatable pins extending into the central aperture.

\* \* \* \* \*